(12) United States Patent
Ferraiolo

(10) Patent No.: US 6,797,221 B2
(45) Date of Patent: Sep. 28, 2004

(54) PROCESS FOR THE MANUFACTURE OF A PROTECTING AND IMMOBILIZING ELEMENT OF THE MATTRESS-LIKE TYPE, AND ELEMENT SO OBTAINED

(75) Inventor: Francesco Ferraiolo, Ca' de' Fabbri (IT)

(73) Assignee: Officine Maccaferri, S.p.A., Bologna (IT)

( * ) Notice: Subject to any disclaimer, the term of this patent is extended or adjusted under 35 U.S.C. 154(b) by 519 days.

(21) Appl. No.: 09/727,591

(22) Filed: Dec. 4, 2000

(65) Prior Publication Data

US 2001/0047550 A1 Dec. 6, 2001

(30) Foreign Application Priority Data

Feb. 22, 2000 (EP) .............................. 00830125

(51) Int. Cl.[7] .................. B29C 39/10; B29C 65/70; B28B 1/16; B28B 23/00; E02B 3/12
(52) U.S. Cl. .................. 264/255; 264/256; 264/258; 264/271.1; 264/275; 264/277; 264/279; 405/16; 405/19; 405/158; 405/172; 52/741.3
(58) Field of Search .................. 264/255, 256, 264/271.1, 275, 277, 279, 258; 405/16, 19, 158, 172; 52/741.3

(56) References Cited

U.S. PATENT DOCUMENTS

| 841,281 A | * | 1/1907 | Thorne ........................ 405/19 |
| 4,477,206 A | | 10/1984 | Papetti et al. ................ 405/172 |
| 4,726,708 A | * | 2/1988 | Papetti ........................ 405/19 |
| 5,259,704 A | * | 11/1993 | Orgorchock ................ 405/262 |
| 5,368,410 A | * | 11/1994 | Ferraiolo .................... 405/16 |

FOREIGN PATENT DOCUMENTS

| DE | 3532640 A1 | * | 4/1986 | ............. E02B/3/14 |
| EP | 0 881 334 A | | 12/1998 | |
| GB | 1 463 743 A | | 2/1977 | |
| GB | 2178127 A | * | 2/1987 | ............. F16L/57/00 |
| JP | 56-052209 A | * | 5/1981 | ............. E02B/3/12 |
| JP | 03-224913 A | * | 10/1991 | ............. E02D/15/10 |
| JP | 06-146239 A | * | 5/1994 | ............. E02B/3/12 |
| JP | 2003-232024 A | * | 8/2003 | ............. E02B/3/14 |

OTHER PUBLICATIONS

JPO English Abstract of JP–56–052209–A, 1998, Japanese Patent Office.*
Derwent English Abstract of DE–3532640–A1, 1999, Derwent.*
JPO English Abstract of JP–03–224913–A, 1998, Japanese Patent Office.*
JPO English machine translation of JP–06–146239–A, 2003, Japanese Patent Office website.*
JPO English machine translation of JP–2003–232024–A, 2003, Japanese Patent Office website.*

\* cited by examiner

Primary Examiner—Michael Colaianni
Assistant Examiner—Michael I. Poe
(74) Attorney, Agent, or Firm—Sughrue Mion, PLLC

(57) ABSTRACT

A process for the manufacture of a protecting and immobilizing element of the mattress-like type consists in providing containing means (2, 20) and a layer of flexible material (3, 21) inside them, with the peripheral edges (4, 22) of the flexible layer (3, 21) protruding from the containing means (2, 20). Anchoring means (5) and a first netting structure (6, 23) are also arranged inside the containing means (2, 20) so that the netting structure (6, 23) is in direct contact with the flexible layer (3, 21) and the anchoring means (5) pass through the netting structure at predetermined positions (12, 25). The containing means (2, 20) are then filled with a filling material (7) comprising solid and/or fluid elements, and a second netting structure (8) is superposed on the filling material. Finally, by superposing, at least partially, the peripheral edges (4, 22) of the flexible layer (3, 21), a closed cover is produced from which the ends (11, 27) of the anchoring means (5) protrude.

7 Claims, 4 Drawing Sheets

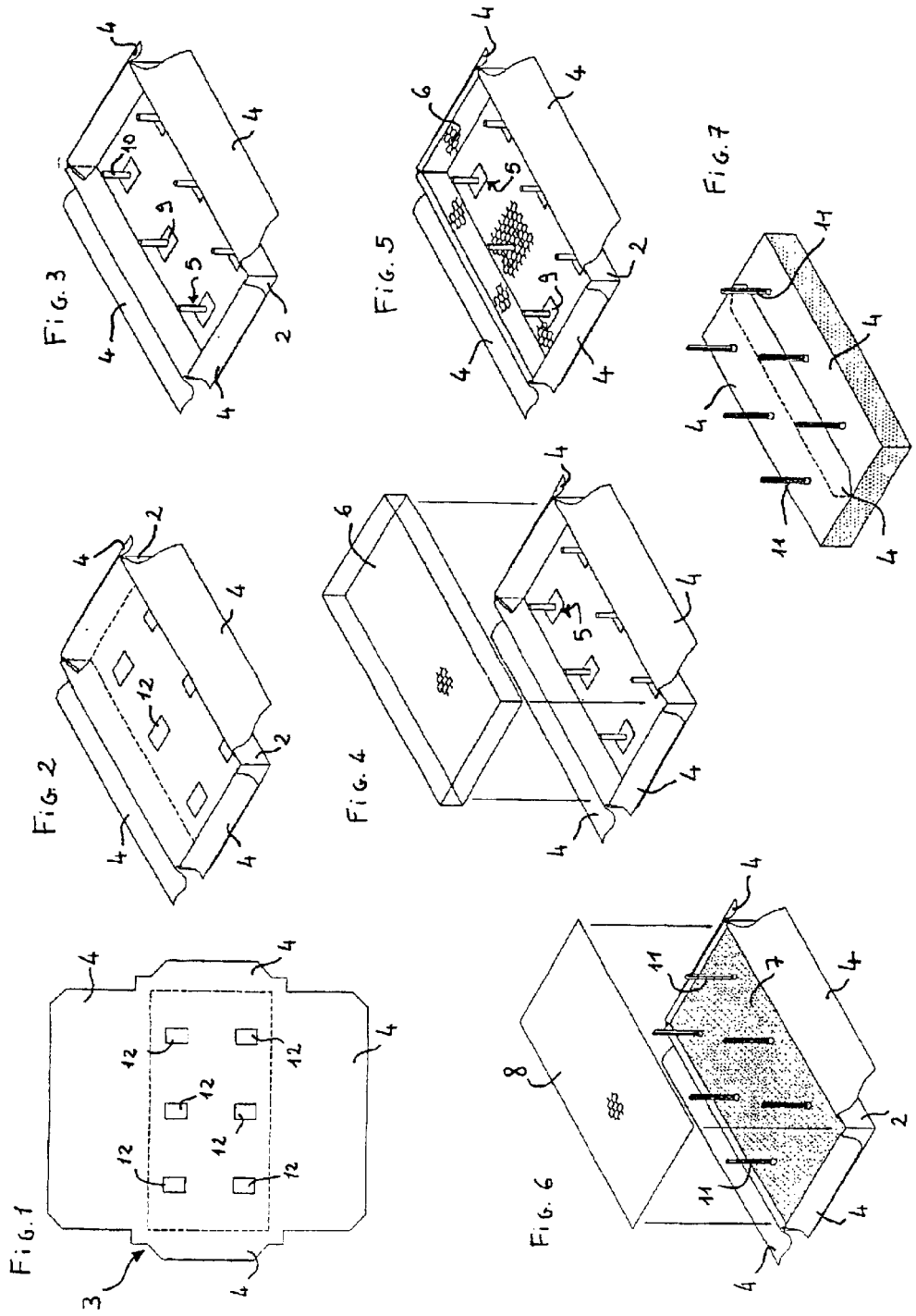

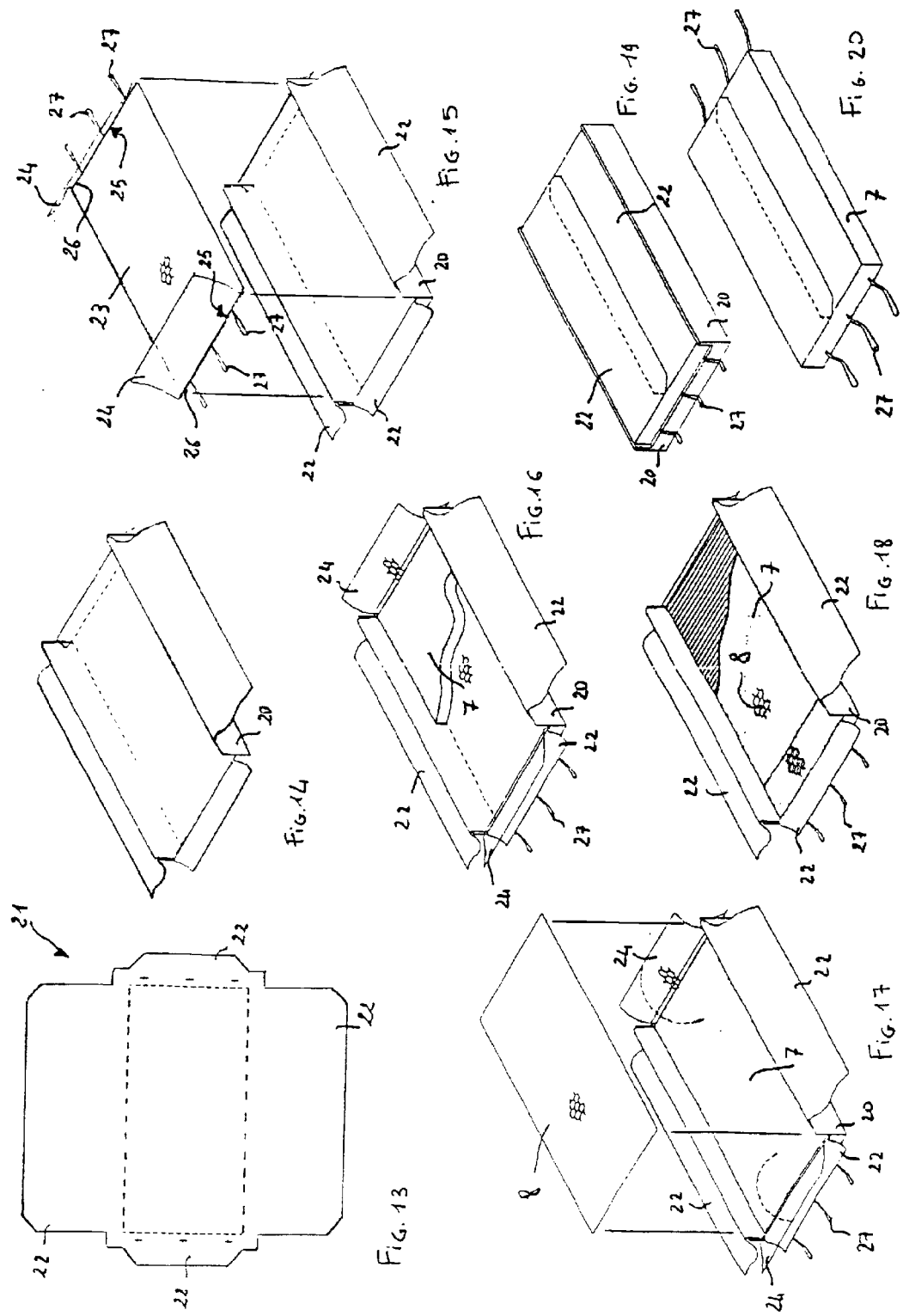

PROCESS FOR THE MANUFACTURE OF A PROTECTING AND IMMOBILIZING ELEMENT OF THE MATTRESS-LIKE TYPE, AND ELEMENT SO OBTAINED

BACKGROUND OF THE INVENTION

The present invention relates to a process for the manufacture of a protecting and immobilising element of the mattress-like type, and to a mattress-like element so obtained, and in particular to a process for the manufacture of a protecting and immobilising mattress for underwater pipes.

It is known from the document U.S. Pat. No. 4,477,206, belonging to the same applicant, to use parallelepipedal flexible protecting elements for immobilising and protecting underwater pipes. Those elements comprise a flexible outer covering which covers a gabion produced from metal material and filled with a mixture composed of bitumen, sand and stones or pebbles. The protecting elements, once manufactured, are to be lowered into water, at the location of the pipes to be protected, by means of handling machines, such as cranes, mechanical arms and the like.

In order to facilitate such positioning, processes are known for the manufacture of mattress-like protecting elements comprising support elements which, in use, facilitate the handling thereof. Document EP0881334, in the name of Giuseppe Sarti & C., illustrates a process for the manufacture of a mattress-like flexible component comprising the stages of covering the chamber of a mould with a cover, positioning inside the chamber a reinforcement of wire netting lying in a plane parallel with the base of the chamber, introducing into the chamber a filling material, which is premixed at high temperature and is composed of an aggregate having dimensions such as to pass through the meshes of the netting until the reinforcement is incorporated, and covering the filling material with the cover.

SUMMARY OF THE INVENTION

The object of the present invention is to provide a process for the manufacture of protecting elements of the mattress-like type in a rapid, efficient and economical manner which thus permits a high degree of saving in terms of installation costs and time.

A further object of the present invention is to optimise the stages of the process for the manufacture of a protecting element of the mattress-like type which is easy to handle and is adaptable to different conditions of use.

In order to achieve the objects indicated above, the present invention relates to a process for the manufacture of protecting elements of the mattress-like type, comprising the stages of providing containing means; providing a layer of flexible material and arranging it inside the containing means, with the peripheral edges of the flexible layer protruding from the containing means; arranging anchoring means and a first netting structure inside the containing means, the netting structure being in direct contact with the flexible layer and the anchoring means passing through the netting structure at predetermined positions; filling the containing means with a filling material comprising solid and/or fluid elements; superposing a second netting structure on the filling material, and superposing, at least partially, the peripheral edges of the flexible layer in such a manner as to produce a closed cover from which the ends of the anchoring means protrude.

One of the main advantages of the present invention is that it provides a process for the manufacture of protecting elements of the mattress-like type, which, by reducing the number of stages necessary compared with the known processes, is rapid and efficient and, at the same time, preserves unchanged all of the characteristics of solidity and flexibility present in the protecting and immobilising elements of known type.

A further advantage of the present invention resides in the use of a filling material which comprises solid elements which are readily available even in situ, and the form and dimensions of which are not limited, as long as the characteristics of resilience of the mattress-like element can be maintained.

Another advantage of the present invention consists in the particular and innovative form of the anchoring means which facilitate the homogeneous distribution of the filling material inside the mould, preventing impurities, discontinuity and residual cavities, and increasing the resilient characteristics of the mattress-like element.

BRIEF DESCRIPTION OF THE DRAWINGS

Further characteristics and advantages will become clear from the following description of a preferred embodiment, with reference to the appended drawings, which are given purely by way of non-limiting example and in which:

FIGS. 1 to 7 are perspective views illustrating the stages of a process for the manufacture of a mattress-like protecting element according to one embodiment of the present invention;

FIGS. 13 to 20 are perspective views illustrating the stages of a further process for the manufacture of a mattress-like protecting element according to another embodiment of the present invention.

DETAILED DESCRIPTION OF THE INVENTION

Figure 8:
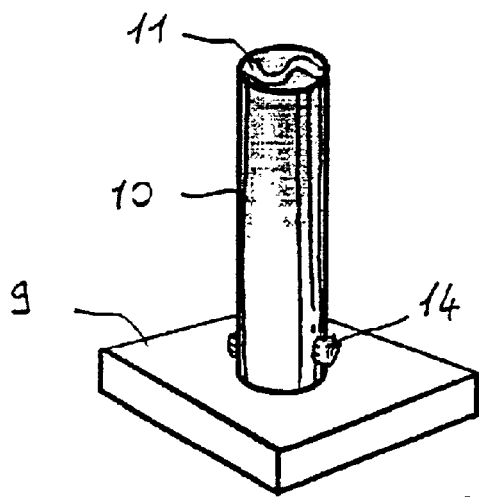
FIGS. 8 to 10 are perspective views of different embodiments of an anchoring means.

Referring now to the drawings, in order to manufacture a protecting element that is in mattress-like form, containing means, for example, although this is not to constitute a limitation, a preferably parallelepipedal mould 2 which has a rectangular base and which is generally produced from a rigid heat-resistant material are first of all provided. A layer of fabric 3 is positioned inside the mould 2, the fabric 3 being constituted, for example, by a so-called "non-woven fabric" which therefore covers the inner portion of the mould. The surface extent of the fabric 3 is larger than the inner surface of the mould 2 so that peripheral edges 4 of the fabric 3 protrude from the mould.

Anchoring means 5 are then arranged at the location of predetermined positions 12, indicated by broken lines in FIGS. 1 and 2, on the central portion of the fabric 3 contained in the mould 2. FIG. 8 shows an embodiment, purely by way of non-limiting example, of an anchoring means 5 comprising a plate 9 to which a hollow cylindrical element 10 is secured in a direction perpendicular to the surface of the plate 9. Two openings 13, which are particularly suitable for the insertion and connection of a pin element 14, are formed in the surface of the hollow cylinder 10 in diametrically opposite positions. The anchoring means 5 also comprise a strap 11, for example of fibres or the like, which is secured to the pin 14 and is accommodated inside the cylinder 10 in such a manner that it is concealed and protected during the process of manufacturing the mattress-like element.

Figure 9:
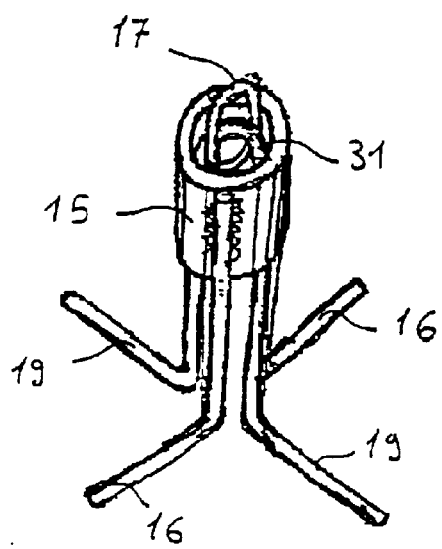
Figure 10:
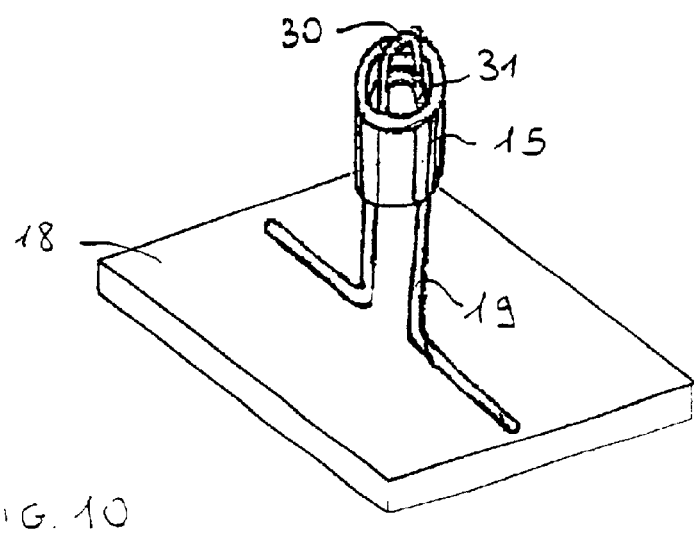

Naturally, the anchoring means 5 can be produced in various different forms, as long as the objects and advantages of the present invention are achieved. For example, in another embodiment, illustrated in FIG. 9, the anchoring means 5 comprise an "omega"-shaped bar 19, the upper end 31 of which is accommodated inside a portion of a hollow cylindrical element 15. Two foot elements 16 are secured to the outer surface of the cylindrical element 15 and rest, together with the lower ends of the bar 19, in direct contact with the surface of the fabric and maintain the cylindrical portion 15 at a height which almost corresponds to the height of the lateral walls of the mould 2. An eye-like element 17 is engaged with the upper end 31 of the bar 19 and is selectively retractable into the cylindrical element 15. In use, during the stages of manufacturing the protecting element, the eye 17 is kept inside the cylindrical element 15 so that it does not interfere with the other elements, while, in the stage of handling the protecting element, the eye 17 is removed from the cylindrical element 15 to enable it to be fastened to fastening means, such as, for example, hooks, ropes, spring catches and the like (not illustrated) In a further embodiment, illustrated in FIG. 10, in order to increase the stability of the anchoring means 5, the lower ends of the bar 19 are connected to a plate-like element 18.

When that preparation stage has been completed, a netting structure 6 is arranged in the mould 2 in such a manner that it is in direct contact with the fabric 3. The structure 6 is produced from double-twist wire netting having hexagonal meshes. In one embodiment of the present invention, the base comprises a panel of wire netting, the hexagonal meshes of which are preferably oriented in such a manner that the portions at the location of which the various wires are twisted with one another extend in the longitudinal direction of the structure 6. The longitudinal lateral walls are constituted by panels of wire netting, likewise having hexagonal meshes, in which the portions at the location of which the various wires are twisted with one another preferably always extend in directions perpendicular to the longitudinal direction of the structure 6. That characteristic is intended to promote the flexibility of the protecting element when it is superposed on a tubular pipe to be protected and immobilised, although it is not to be regarded as limiting.

Figure 11:
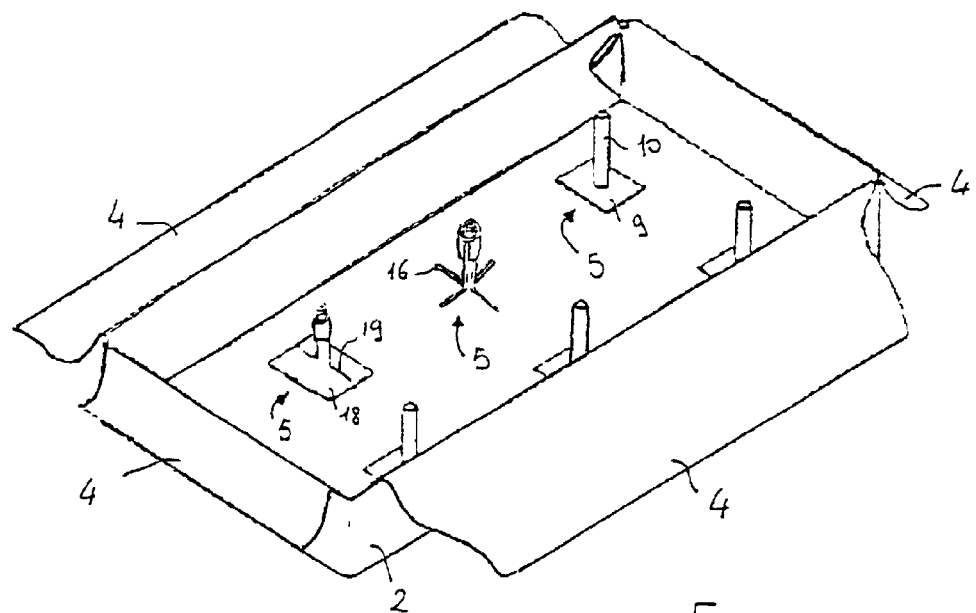
FIG. 11 is a sectional view of the mattress-like protecting element during stage e) of the process according to the present invention.
Figure 12:
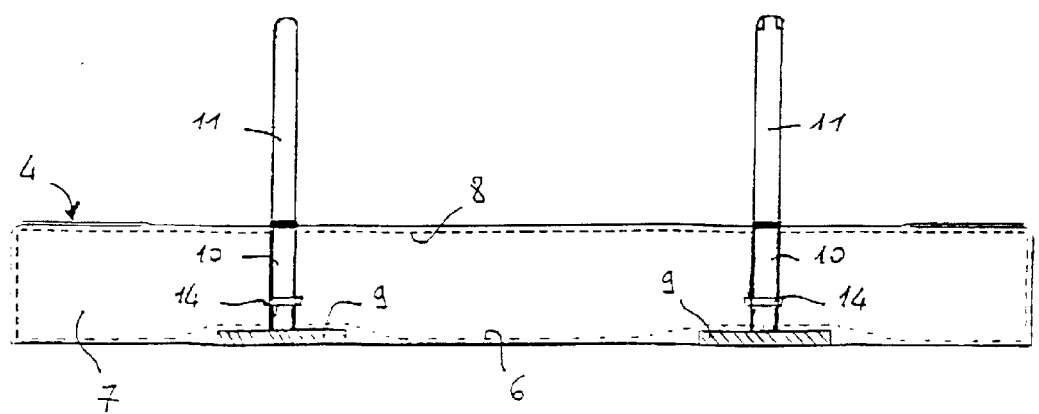
FIG. 12 is a perspective view of stage d) of the process according to the present invention in which different embodiments of the anchoring means are illustrated.

Finally, the hexagonal meshes of the wire netting of the base of the structure 6 are of a size such as to permit the complete passage of the cylindrical element 10 of the anchoring means 5, and thus to enable the netting structure 6 to adhere to the fabric 3, so that, as illustrated in FIG. 11, the plate 9 is compressed between the fabric 3 and the base of the netting structure 6.

According to the process of the present invention, the mould 2 is then filled with a filling material 7 of known type, comprising, for example, a hot mixture of crushed stones and/or pebbles, mastic based on sand and bitumen, or any other type of mixture comprising solid and/or fluid elements which ensures a semi-plastic consistency down to low temperatures. Naturally, the solid elements may be inserted in the mould 2 before the mastic is poured in, without preliminary crushing operations, thus reducing manufacturing costs, as long as the resilient characteristics of the mattress-like protecting element are ensured at the end of the process.

The ratio between the amount of solid material and the amount of mastic poured in is advantageously to be such that the mastic occupies from 30 to 40% of the volume of the mould. To achieve that result, it is possible, for example, to use a mastic based on sand "filler" and bitumen, the composition of which is such as to ensure good flexibility under the conditions of use.

The filling material 7 is poured into the mould 2 until its level reaches approximately the height of the lateral walls of the mould 2, but leaving the upper ends of the cylindrical elements 10 emerging at least partially and avoiding the formation of residual cavities by spreading and levelling operations.

Before the filling material 7 reaches its setting point, the mould 2 is covered with a further netting structure 8 in order to ensure continuity of form and material with the first netting structure 6, and to constitute a carrying structure for the mattress-like element. Given the chemical and physical characteristics of the filling material, once cooled, it will constitute a natural securing element between the two netting structures 6 and 8. Of course, the further netting structure 8 also is preferably produced from double-twist wire netting having hexagonal meshes of a size such as to permit the passage of the cylindrical element 10 of the anchoring means 5.

Finally, the peripheral edges 4 of the layer of fabric 3, which have remained outside the mould 2 during the first stages of the process, are lifted and secured to one another in such a manner as to close the entire layer of fabric 3 on itself and to produce the mattress-like protecting element.

The peripheral edges 4 are to permit, by means of openings which are predefined or formed during the manufacture of the mattress-like element, the emergence of the upper ends of the cylinders 10 of the anchoring means 5, in order to render accessible the straps 11 contained inside them.

In order to facilitate the moving and handling of the mattress-like protecting element, the straps 11 can be removed from the cylinder 10 and thus provide anchoring and fastening points for handling means (not illustrated). The vertical stresses caused by the lifting forces will be distributed by the anchoring means 5 onto the plates 9 which, being positioned beneath the netting structure 6 in direct contact with the layer of fabric 3, will in turn distribute the stresses over the entire extent of the mattress-like protecting element.

In another embodiment, the structure of the mattress-like protecting element may be further reinforced by means of steel cables, or stranded wire, anchored to the upper corners of the netting structure 6, or preferably superposed on the other netting structure 8.

According to a further process for the manufacture of a protecting element of the mattress-like type according to a further embodiment of the present invention, as illustrated in FIGS. 13 to 20, containing means, for example, although this is not to constitute a limitation, a preferably parallelepipedal mould 20 which has a rectangular base and which is generally produced from a rigid heat-resistant material are first of all provided. A layer of fabric 21 is positioned inside the mould 20, the fabric being constituted, for example, by a so-called "non-woven fabric", which therefore covers the inner portion of the mould. The surface extent of the fabric 21 is larger than the inner surface of the mould 20 so that peripheral edges 22 of the fabric 21 protrude from the mould.

A netting structure 23 is then arranged inside the mould 20 in such a manner that it is in direct contact with the fabric 21. The structure 23 is produced from double-twist wire netting having hexagonal meshes. In one embodiment of the present invention, the base comprises a panel of wire netting, the hexagonal meshes of which are preferably oriented in such a manner that the portions at the location of which the various wires are twisted with one another extend in the longitudinal direction of the netting structure 23. That characteristic is intended to promote the flexibility of the protecting element when it is superposed on a tubular pipe to be protected and immobilised, although it is not to be regarded as limiting.

The longitudinal surface extent of the netting structure 23 is larger than the inner surface of the mould 20, so that the peripheral edges 24 of the netting structure 23 are bent in accordance with a line 25 and protrude from the mould 2.

Anchoring means are then arranged at the location of the bending lines 25 on the inner surface of the netting structure 23 contained inside the mould 20. FIG. 15 illustrates an embodiment, purely by way of non-limiting example, of an anchoring means comprising a rod 26 to which a plurality of straps 27, for example of fibres or the like, are secured. Naturally, the anchoring means may be produced in various different forms, as long as the objects and advantages of the present invention are achieved.

Finally, the hexagonal meshes of the peripheral edges 24 of the wire netting of the netting structure 23 are of a size such as to permit the complete passage of the straps 27, as illustrated in FIG. 15.

According to this process, the mould 20 is then filled with a filling material 7 of known type, comprising, for example, a hot mixture of crushed stones and/or pebbles, mastic based on sand and/or bitumen, or any other type of mixture comprising solid and/or fluid elements which ensures a semi-plastic consistency down to low temperatures. Naturally, the solid elements may be inserted in the mould 20 before the mastic is poured in, without preliminary crushing operations, thus reducing the manufacturing costs, as long as the resilient characteristics of the mattress-like protecting element are ensured at the end of the process.

The ratio between the amount of solid material and the amount of mastic poured in is advantageously to be such that the mastic occupies from 30 to 40% of the volume of the mould. To achieve that result, it is possible to use, for example, a mastic based on sand "filler" and bitumen, the composition of which is such as to ensure good flexibility under the conditions of use.

The filling material 7 is poured into the mould 20 until its level reaches approximately the height of the lateral walls of the mould 20, avoiding the formation of residual cavities by spreading and levelling operations.

Before the filling material 7 reaches its setting point, the peripheral edges 24 of the netting structure 23, which have remained outside the mould 20 during the first stages of the process, are bent towards the upper surface of the filling material 7 which, in turn, is covered by a further netting structure 8, in order to ensure continuity of form and material with the first netting structure 23, and to constitute a carrying structure for the mattress-like element. Given the chemical and physical characteristics of the filling material, once cooled, it will constitute a natural securing element between the two netting structures 23 and 8 and the peripheral edges 24. Naturally, the further netting structure 8 also is preferably produced from double-twist wire netting having hexagonal meshes.

In a further, alternative, embodiment of the present invention, the peripheral edges 24 of the netting structure 23 are bent towards the base of the netting structure 23 before starting the stage of filling the mould 20, thus ensuring that the anchoring means have greater stability inside the netting structure 23.

Finally, the peripheral edges 22 of the layer of fabric 21, which have remained outside the mould 20 during the first stages of the process, are lifted and secured to one another in such a manner as to close the entire layer of fabric 21 on itself and to produce the mattress-like protecting element.

The peripheral edges 22 are to permit, by means of openings which are predefined or produced during the manufacture of the mattress-like element, the emergence of the straps 27 in order to render them accessible to any handling means (not illustrated) and thus to facilitate the moving and handling of the mattress-like protecting element.

Naturally, the principle of the invention remaining the same, the forms of embodiment and details of manufacture may be varied widely with respect to those defined in the claims which follow, without thereby departing from the scope of the present invention.

What is claimed is:

1. A process for the manufacture of a protecting and immobilising element having a mattress shape, comprising the stages of providing containing means (2, 20); providing a layer of flexible material (3, 21) and arranging it inside the containing means (2, 20), with the peripheral edges (4, 22) of the flexible layer (3, 21) protruding from the containing means (2, 20); arranging anchoring means (5) and a first netting structure (6, 23) inside the containing means (2, 20), the netting structure (6, 23) being in direct contact with the flexible layer (3, 21) and the anchoring means (5) passing through the netting structure at predetermined positions (12, 25); filling the containing means (2, 20) with a filling material (7) comprising solid and/or fluid elements; superposing a second netting structure (8) on the filling material (7), and superposing, at least partially, the peripheral edges (4, 22) of the flexible layer (3, 21) in such a manner as to produce a closed cover from which the ends (11, 27) of the anchoring means (5) protrude.

2. A process according to claim 1, characterised in that it comprises the following stages:
   a) providing a mould (2);
   b) providing a layer of flexible material (3);
   c) arranging the flexible layer (3) inside the mould (2), the peripheral edges (4) of the flexible layer (3) protruding from the mould (2);
   d) arranging anchoring means (5) at predetermined positions (12) on the surface of the flexible layer (3);
   e) arranging, inside the mould (2) and in direct contact with the flexible layer (3), a first netting structure (6), the anchoring means (5) passing through the first netting structure (6);
   f) filling the mould (2) with a filling material (7) comprising solid and/or fluid elements, the upper ends of the anchoring means (5) emerging from the layer of filling material (7);
   g) superposing a second netting structure (8) on the filling material (7), the upper ends of the anchoring means (5) passing through the second netting structure (8); and
   h) closing the peripheral edges (4) of the flexible layer (3) in such a manner as to produce a closed cover from which the upper ends of the anchoring means (5) emerge.

3. A process according to claim 2, characterised in that the anchoring means (5) comprise at least one plate (9) secured to at least one cylindrical element (10) extending perpendicularly relative to the surface of the plate (9), the cylindrical element (10) comprising fastening means (11, 14, 17).

4. A process according to claim 3, characterised in that, during stage d), the plate (9) is arranged in direct contact with the surface of the flexible layer (3).

5. A process according to claim 4, characterised in that, during stage e), the plate (9) is disposed between the surface of the flexible layer (3) and the netting structure (6).

6. A process according to claim 1, characterised in that it comprises the following stages:

a) providing a mould (20);

b) providing a layer of flexible material (21);

c) arranging the flexible layer (21) inside the mould (20), the peripheral edges (22) of the flexible layer (21) protruding from the mould (20);

d) arranging, inside the mould (20) and in direct contact with the flexible layer (21), a first netting structure (23), the peripheral edges (24) of the netting structure (23) protruding from the mould (20);

e) arranging anchoring means (5) at predetermined positions (25) on the upper surface of the netting structure (23), the anchoring means (5) passing through the first netting structure (23);

f) filling the mould (20) with a filling material (7) comprising solid and/or fluid elements;

g) superposing, at least partially, the peripheral edges (24) of the netting structure (23) on the filling material (7), and superposing a second netting structure (8) on the filling material (7) and on the peripheral edges (24); and h) superposing, at least partially, the peripheral edges (22) of the flexible layer (21) in such a manner as to produce a closed cover from which the ends (27) of the anchoring means (5) protrude.

7. A process according to claim 6, characterised in that, between stage e) and stage h), it comprises the following stages:

f) superposing, at least partially, the peripheral edges (24) of the netting structure (23) on the base of the netting structure (23);

g) filling the mould (20) with a filling material (7) comprising solid and/or fluid elements, and superposing on the filling material (7) a second netting structure (8).

* * * * *